United States Patent
Reynolds et al.

(10) Patent No.: US 10,641,391 B2
(45) Date of Patent: May 5, 2020

(54) SYSTEM AND METHOD FOR CVT CLAMP CONTROL BASED ON ONCOMING CONDITIONS IN A VEHICLE PROPULSION SYSTEM

(71) Applicant: GM GLOBAL TECHNOLOGY OPERATIONS LLC, Detroit, MI (US)

(72) Inventors: Craig D. Reynolds, Davisburg, MI (US); Avinash Singh, Sterling Heights, MI (US); Bret M. Olson, Whitelake, MI (US); Douglas A. Ward, Holly, MI (US); Nolan K. Perry, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 187 days.

(21) Appl. No.: 15/959,668

(22) Filed: Apr. 23, 2018

(65) Prior Publication Data

US 2019/0323602 A1  Oct. 24, 2019

(51) Int. Cl.
| | |
|---|---|
| *F16H 61/662* | (2006.01) |
| *F16H 59/66* | (2006.01) |
| *F16H 59/50* | (2006.01) |

(52) U.S. Cl.
CPC ....... *F16H 61/66272* (2013.01); *F16H 59/50* (2013.01); *F16H 59/66* (2013.01); *F16H 2059/506* (2013.01)

(58) Field of Classification Search
None
See application file for complete search history.

(56) References Cited

U.S. PATENT DOCUMENTS

| | | |
|---|---|---|
| 7,720,587 B2 | 5/2010 | McDonald et al. |
| 7,739,019 B2 | 6/2010 | Robert et al. |
| 7,801,333 B2 | 9/2010 | Laurent et al. |
| 7,872,764 B2 | 1/2011 | Higgins-Luthman et al. |
| 9,139,204 B1 | 9/2015 | Zhao et al. |
| 9,151,382 B2 | 10/2015 | Zhang et al. |
| 9,355,319 B2 | 5/2016 | Jang et al. |
| 9,453,941 B2 | 9/2016 | Stainvas Olshansky et al. |
| 9,598,087 B2 | 3/2017 | Zhao et al. |
| 9,689,495 B2 | 6/2017 | Zhang et al. |
| 9,902,229 B2 | 2/2018 | Mettrick et al. |

(Continued)

FOREIGN PATENT DOCUMENTS

WO   WO-2017186911 A1 * 11/2017 ....... F16H 61/66272

*Primary Examiner* — Justin Holmes

(57) ABSTRACT

A vehicle propulsion system includes an oncoming condition sensor that generates an oncoming condition signal, a continuously variable transmission with a variator assembly adapted to transfer torque between a first rotating member and a second rotating member through a flexible continuous device rotatably coupling the first rotating member to the second rotating member, one of the first rotating member and second rotating member including a clamping pulley adapted to controllably adjust a clamping force on the flexible continuous device, and a controller in communication with the oncoming condition sensor and the continuously variable transmission that is programmed to characterize an oncoming condition based upon the oncoming condition signal and to control the clamping pulley to adjust the clamping force based on the characterization of the oncoming condition.

18 Claims, 3 Drawing Sheets

(56) References Cited

U.S. PATENT DOCUMENTS

| | | |
|---|---|---|
| 9,950,700 B2 | 4/2018 | Tong et al. |
| 2002/0165064 A1* | 11/2002 | Miki .................. B60W 30/182 |
| | | 477/45 |
| 2017/0106855 A1 | 4/2017 | Lavoie et al. |
| 2017/0211700 A1 | 7/2017 | Nassouri et al. |
| 2017/0349148 A1 | 12/2017 | Bojanowski et al. |
| 2018/0065639 A1 | 3/2018 | Barath et al. |
| 2018/0141540 A1* | 5/2018 | Kumazaki ............. B60W 10/04 |

* cited by examiner

SYSTEM AND METHOD FOR CVT CLAMP CONTROL BASED ON ONCOMING CONDITIONS IN A VEHICLE PROPULSION SYSTEM

FIELD

The present disclosure relates to a system and method for CVT clamp control based on oncoming conditions in a vehicle propulsion system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

A continuously variable transmission (CVT) is a type of power transmission that is capable of continuously changing an output/input speed ratio over a range between a minimum (underdrive) ratio and a maximum (overdrive) ratio, thus permitting an infinitely variable selection of engine operation that can achieve a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system to achieve the infinitely variable selection of gear ratios.

The pulley system, which is commonly referred to as a variator assembly, can transition anywhere within the calibrated range of speed ratios. A typical belt-type or chain-type variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and an input gear set, and thus acts as a driving/primary pulley. The other pulley is connected via additional gear sets to an output shaft of the CVT and thus acts as a driven/secondary pulley. One or more planetary gear sets may be used on the input or output sides of the variator assembly, depending on the configuration.

In order to vary a CVT speed ratio and to transfer torque to the drivetrain, a clamping force (applied through hydraulic pressure) may be applied to one or both of the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This, in turn, changes the effective diameters of the variator pulleys and may vary the speed ratio of the CVT. A clamping force may also be applied to transfer a desired amount of torque from one pulley to another through the continuous member, where the amount of clamping force applied is intended to prevent the continuous member from slipping on the pulleys.

A CVT control system can be programmed to respond to outside events, such as wheel slip or other events that create the need for a high torque carrying capacity by the CVT continuous member. For example, when the wheels are slipping, this may be an indication that the variator assembly will soon require additional torque carrying capacity due to a spike or disturbance in output torque. Accordingly, a CVT control system may apply a maximum clamping pressure to the CVT pulleys when detecting wheel slip, to prevent the continuous member from slipping. Such maximum clamping pressure, however, has a negative effect on fuel economy.

When a vehicle travels over rough road, vibration is transmitted through wheels of the vehicle, possibly producing adverse effects. For example, a disturbance may result in a driveline vibration that may cause a belt of a continuously variable transmission (CVT) to slip, which may increase belt wear and introduce additional torque disturbances. Conventional vehicle propulsion systems are reactive to these disturbances. In other words, such systems wait for such a condition to introduce excitations to the vehicle before determining whether the condition is present and reacting to that determination. The inherent delays in these systems only exacerbate the problem.

SUMMARY

In an exemplary aspect, a vehicle propulsion system includes an oncoming condition sensor that generates an oncoming condition signal, a continuously variable transmission with a variator assembly adapted to transfer torque between a first rotating member and a second rotating member through a flexible continuous device rotatably coupling the first rotating member to the second rotating member, one of the first rotating member and second rotating member including a clamping pulley adapted to controllably adjust a clamping force on the flexible continuous device, and a controller in communication with the oncoming condition sensor and the continuously variable transmission that is programmed to characterize an oncoming condition based upon the oncoming condition signal and to control the clamping pulley to adjust the clamping force based on the characterization of the oncoming condition.

In this manner, the durability, performance, drivability, and efficiency of a vehicle propulsion system incorporating a continuously variable transmission (CVT) may be improved by adapting the clamping forces of the CVT to a characterization of oncoming conditions, both in magnitude and temporally. This further improves the ability to optimize the clamping forces more closely to the oncoming conditions.

In another exemplary aspect, the oncoming condition sensor is one or more of a camera, a LIDAR sensor, a RADAR sensor, an infrared sensor, and a SONAR sensor.

In another exemplary aspect, the controller is programmed to characterize an oncoming condition as one of a single event, an extended rough road, a nominal road, a smooth road, and an abrupt maneuver.

In another exemplary aspect, the controller controls the clamping pulley to reduce the clamping force in response to the oncoming condition being characterized as a smooth road.

In another exemplary aspect, the controller controls the clamping pulley to increase the clamping force in response to the oncoming condition being characterized as an extended rough road.

In another exemplary aspect, the controller is further programmed to characterize a start time and an end time of the oncoming condition.

In another exemplary aspect, the controller controls the clamping pulley based upon the characterized start time and end time of the oncoming condition.

In another exemplary aspect, the controller controls the clamping pulley to increase the clamping force at the start time of the oncoming condition and to reduce the clamping force after the end time of the oncoming condition.

In another exemplary aspect, the controller controls the clamping pulley to increase the clamping force in response to the oncoming condition being characterized as an abrupt maneuver.

In another exemplary aspect, the controller is further programmed to characterize the oncoming condition in terms of a wheel slip magnitude, and wherein the controller controls the clamping pulley based upon the wheel slip magnitude.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
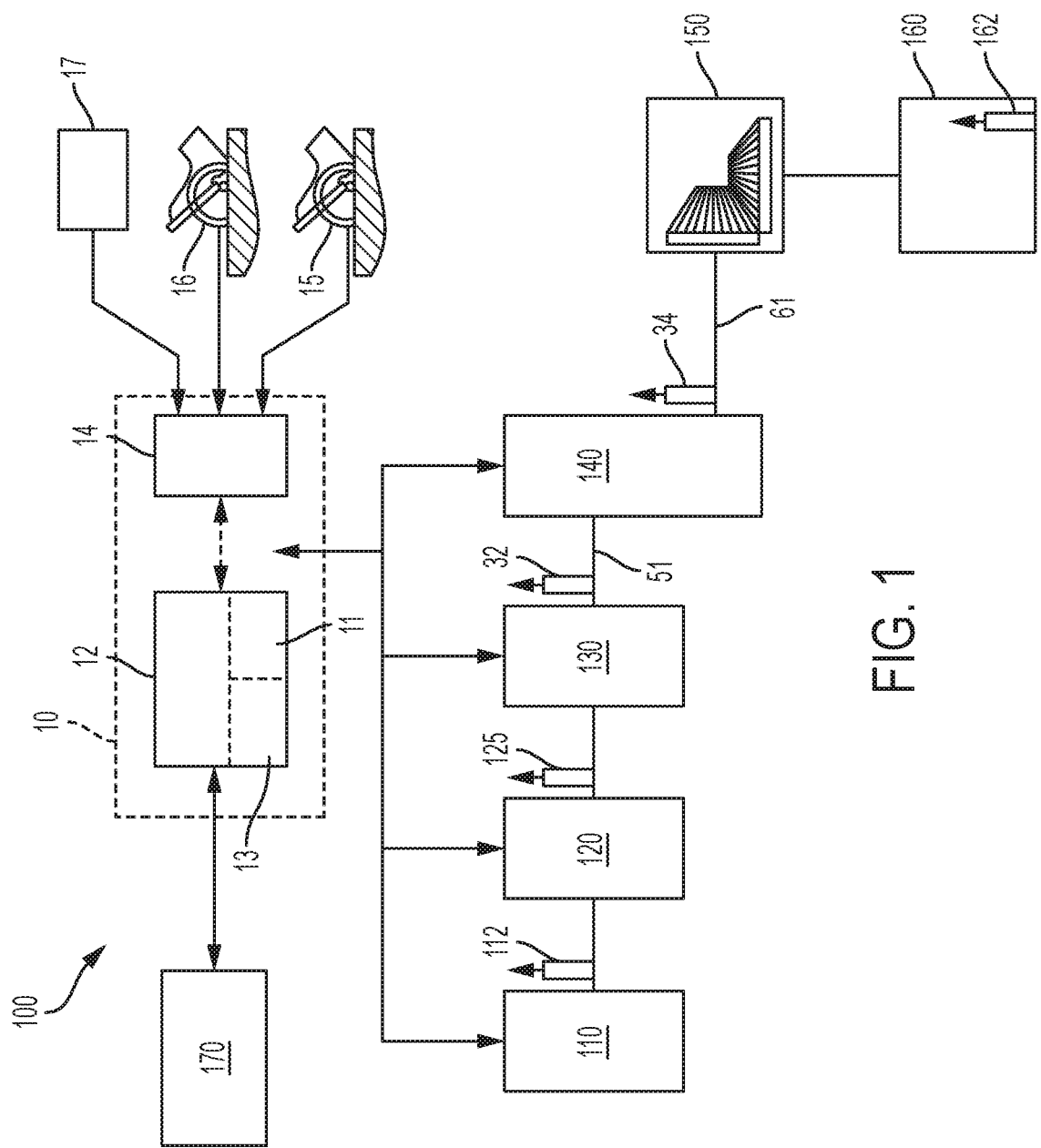
FIG. 1 is a schematic illustration of a vehicle propulsion system that includes an internal combustion engine rotatably coupled to a continuously variable transmission (CVT) via a torque converter and a gear box, in accordance with an exemplary embodiment of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These are similar to directional terms and are not to be construed to limit the scope of the disclosure in any manner.

Referring now to the drawings, wherein like reference numbers correspond to like or similar components throughout the several figures, FIG. 1 schematically illustrates elements of a vehicle propulsion system 100 that includes an engine 110, such as an internal combustion engine, rotatably coupled to a continuously variable transmission (CVT) 140 via a torque converter 120 and a gear box 130. The vehicle propulsion system 100 is coupled via a driveline 150 to a set of vehicle wheels 160 to provide tractive effort when employed on a vehicle. Operation of the vehicle propulsion system 100 may be monitored and controlled by a controller 10 in response to driver commands and other vehicle operation factors. The vehicle propulsion system 100 may be part of a device which may be a vehicle, a robot, farm implement, sports-related equipment or any other transportation device.

The engine 110 may be any suitable engine, such as an internal combustion engine capable of transforming hydrocarbon fuel to mechanical power to generate torque in response to commands originating from the controller 10. The engine 110 may also or alternatively include an electric motor (not shown). The torque converter 120 may be a device providing fluidic coupling between its input and output members for transferring torque.

The output member of the torque converter 120 rotatably couples to the gear box 130, which includes meshed gears or other suitable gearing mechanisms that provide reduction gearing between the torque converter 120 and the CVT 140. Alternatively, the gear box 130 may be another suitable gear configuration for providing gearing between the engine 110, the torque converter 120 and the CVT 140, including, by way of non-limiting examples, a chain drive gear configuration or a planetary gear configuration. In alternative examples, either or both the torque converter 120 and the gear box 130 may be omitted.

The gear box 130 includes an output member that rotatably couples to the CVT 140 via an input member 51. One example of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gear set, a chain drive gear set or another suitable gear arrangement for transferring torque to one or more vehicle wheels 160.

The vehicle propulsion system 100 preferably includes one or more sensors or sensing devices for monitoring rotational speeds of various devices, including, e.g., an engine speed sensor 112, a torque converter turbine speed sensor 125, a CVT variator input speed sensor 32, a CVT variator output speed sensor 34, and one or more wheel speed sensors 162 for any wheel of the set of wheels 160. Each of the aforementioned speed sensors may be any suitable position/speed sensing device, such as a Hall-effect sensor. Each of the aforementioned speed sensors communicates with the controller 10.

The vehicle propulsion system 100 further includes one or more oncoming condition sensors for monitoring a condition and/or conditions the vehicle propulsion system 100 will be exposed to as the vehicle continues to travel. For example, an exemplary oncoming condition sensor 170 may include a forward camera module which views the environment ahead of the vehicle, obtains images of that environment, processes those images, and, together with the controller 10, determines the oncoming conditions based upon that analysis. In an exemplary aspect, the camera module may obtain images that may be analyzed to identify and potentially classify disturbances in the road surface, such as, for example, an object on the road surface, a pothole, or the like, the module may further be able to distinguish between varying surface conditions, such as, for example, a smooth surface, a rough surface (like a gravel or cobblestone road), and the like, without limitation. The oncoming condition sensor 170 may form any type of sensor such as, a camera, a LIDAR sensor, a RADAR sensor, a SONAR system, or the like, without limitation.

The controller 10 preferably includes at least one processor 12 and may include a user interface 14. A single processor 12 is shown for ease of illustration. The processor 12 may include a plurality of processors wherein each of the processors 12 may be associated with monitoring and controlling a single system. This may include an engine controller for controlling the engine 110 and a transmission controller for controlling the CVT 140 and for monitoring and controlling a single subsystem, e.g., a torque converter clutch.

The processor 12 preferably includes at least one processor and at least one memory device 11 (or any non-transitory, tangible computer readable storage medium) on which are recorded instructions for executing instruction sets for controlling the CVT 140, and a memory cache 13. The memory device 11 can store controller-executable instruction sets, and the processor can execute the controller-executable instruction sets stored in the memory 11.

The user interface 14 communicates with and monitors operator input devices, such as, for example, an accelerator pedal 15, a brake pedal 16, and a transmission gear selector 17. The user interface 14 determines an operator torque request based upon the afore-mentioned operator inputs. In one example, the transmission gear selector 17 includes a tap-up/tap-down feature, whereby a vehicle operator may manually select a transmission gear ratio, thus overriding transmission control.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between different controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
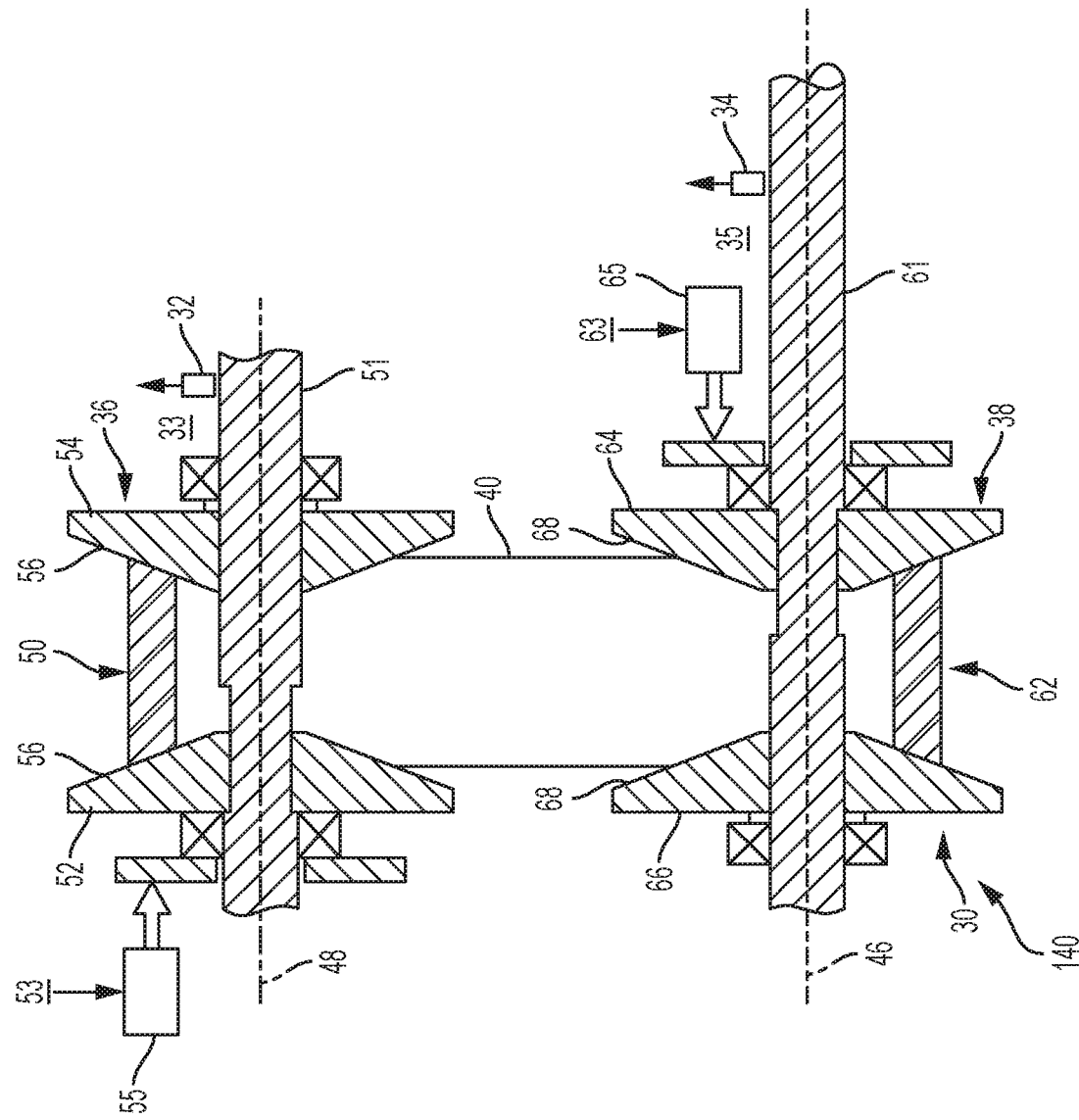
FIG. 2 schematically illustrates elements of a variator assembly or variator assembly of a chain-type or belt-type continuously variable transmission.

FIG. 2 schematically illustrates elements of a variator assembly 30 of a chain-type or belt-type continuously variable transmission (CVT) 140 that may be advantageously controlled by the controller 10. The variator 30 transfers torque between the first rotating member 51, or input member, and the second rotating member 61, or output member.

The variator assembly 30 includes a first, or primary pulley 36, a second, or secondary pulley 38, and a continuous rotatable device 40, such as a belt or chain, or any flexible continuous rotating device, that rotatably couples the first and second pulleys 36, 38 to transfer torque therebetween. The first pulley 36 rotatably attaches to the input member 51, the second pulley 38 rotatably attaches to the output member 61, and the rotatable device 40 may be adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. One of the first and second pulleys 36, 38 may act as a ratioing pulley to establish a speed ratio and the other of the first and second pulleys 36, 38 may act as a clamping pulley to generate sufficient clamping force to transfer torque therebetween. As used herein, the term 'speed ratio' refers to a variator speed ratio, which may be a ratio of a CVT output speed and a CVT input speed.

The first pulley 36 may be split perpendicular to the first axis 48 to define an annular first groove 50 that may be formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48 without allowing rotational movement about the first axis 48. The stationary first sheave 54 may be disposed opposite the moveable first sheave 52. The stationary first sheave 54 may be axially fixed to the input member 51 along the first axis 48. As such, the stationary first sheave 54 does not move in the axial direction of the first axis 48.

The moveable first sheave 52 and the stationary first sheave 54 each include a first groove surface 56. The first groove surfaces 56 of the moveable first sheave 52 and the stationary first sheave 54 are disposed opposite each other to define the annular first groove 50 therebetween. The opposed first groove surfaces 56 preferably form an inverted frustoconical shape such that a movement of the moveable first sheave 52 towards the stationary first sheave 54 increases an outer pulley diameter of the annular first groove 50. An actuator 55 may be arranged with the first pulley 36 to control an axial position of the moveable first sheave 52 in response to a drive signal 53, including urging the moveable first sheave 52 towards the stationary first sheave 54.

Similar to the first pulley 36, the second pulley 38 may be split perpendicular to the second axis 46 to define an annular second groove 62 therebetween. The annular second groove 62 may be disposed perpendicular to the second axis 46. The second pulley 38 includes a moveable sheave 64 and a stationary sheave 66. The moveable sheave 64 axially moves or translates along the second axis 46 relative to the stationary sheave 66, for example, along a spline on the output member 61.

The stationary second sheave 66 may be disposed opposite the moveable second sheave 64. The stationary second sheave 66 may be axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the second sheaves 64, 66 are disposed opposite each other to define the annular second groove 62 therebetween.

The opposed second groove surfaces 68 preferably form an inverted frustoconical shape such that a movement of the moveable second sheave 64 towards the stationary second sheave 66 increases an outer pulley diameter of the annular second groove 62. An actuator 65 may be arranged with the second pulley 38 to control an axial position of the moveable second sheave 64 in response to a driven signal 63, including urging the moveable second sheave 64 towards the stationary second sheave 66.

In one example, the actuators 55, 65 may be hydraulically-controlled devices, and the driven signals 53, 63 may be hydraulic pressure signals. A ratio of the outer pulley diameter of the first pulley 36 and the outer pulley diameter of the second pulley 38 defines a transmission torque ratio.

Other elements, such as clutch assemblies in the form of selectable one-way clutches and the like may be deployed between the variator 30 and other powertrain and driveline components and systems.

In an exemplary aspect of the present disclosure, the controller 10 of the vehicle propulsion system 100 may translate the characterized oncoming condition into terms of wheel slip which is readily consumable by existing CVT clamp control strategies and, thus, readily implementable. The main problem being addressed here is hardware protection for the CVT by ensuring that the chain does not slip on the pulleys. Chain slip may result in permanent damage to the CVT. In general, the manner in which CVT chain slip is prevented is through control and adjustment of clamping pressure. Typically, clamp pressure may be based upon multiple different inputs, however, the input torque to the system and adjustment for known losses in the system are known factors which affect clamp pressure adjustment. There are also external factors which may impact CVT clamp pressure adjustments and conventionally, CVT clamp controller typically also rely upon input from wheel speed sensors and transmission output speed sensors (as a backup to wheel speed sensors). Both of these are directed toward determining a potential wheel slip. A wheel slip may be indicative of a speed differential between the wheels of the vehicle which may occur on a road surface having a low coefficient of friction. In such an instance, the wheel speed may increase and/or accelerate. The issue comes when that wheel may experience a subsequent quick reduction in speed and/or high level of deceleration which may introduce a torque back into the system through the output from the CVT which may cause a chain slip and potential damage to the CVT. It is desirable to avoid this damage.

The controller 10 may be configured to identify any number of various disturbances based upon data received from the oncoming condition sensor 170, such as a generalized road disturbance, a sudden deceleration of the vehicle, and/or a rolling change of direction of the vehicle, by way of example. The controller 10 may be further configured to translate the oncoming condition into an oncoming wheel slip magnitude. Upon an identification that the wheel slip magnitude may exceed a predetermined threshold, a corresponding CVT clamping compensation strategy may be implemented to protect the variator assembly 30 of the CVT 140. The controller 10 may adjust the clamping pressure being supplied to the pulleys 36, 38 to overclamp (or clamp at a greater pressure) the chain or belt 40 in order to protect the CVT 140. The adjustment of the variator torque capacity and/or the clamping pressure in the CVT 140 may have a similar effect to a downshift in a step gear transmission to protect the CVT 140 from damage. The adjusted variator torque capacity or clamping pressure are transmitted to the CVT 140 to apply the desired adjustment to the clamping pressure and/or change in the variator torque capacity to the CVT 140.

The magnitude of the torque disturbance and corresponding oncoming wheel slip magnitude varies with the severity of the road conditions and vehicle operating state (throttle, speed, ratio, etc.). For example, a pothole impact will result in a larger torque disturbance and potential wheel slip than a rough road.

Continued wheel slip events may also be identified using the data from the oncoming condition sensor 170 and characterized as extended wheel slip and which can vary in magnitude. Extended wheel slip events as may be present while the vehicle travels on, for example, a rough road, may be indicated to the controller 12 as, for example, a number of oncoming disturbances during an oncoming time frame. An oncoming disturbance may be defined in terms of a potential wheel slip that violates a calibratable threshold.

Figure 3:
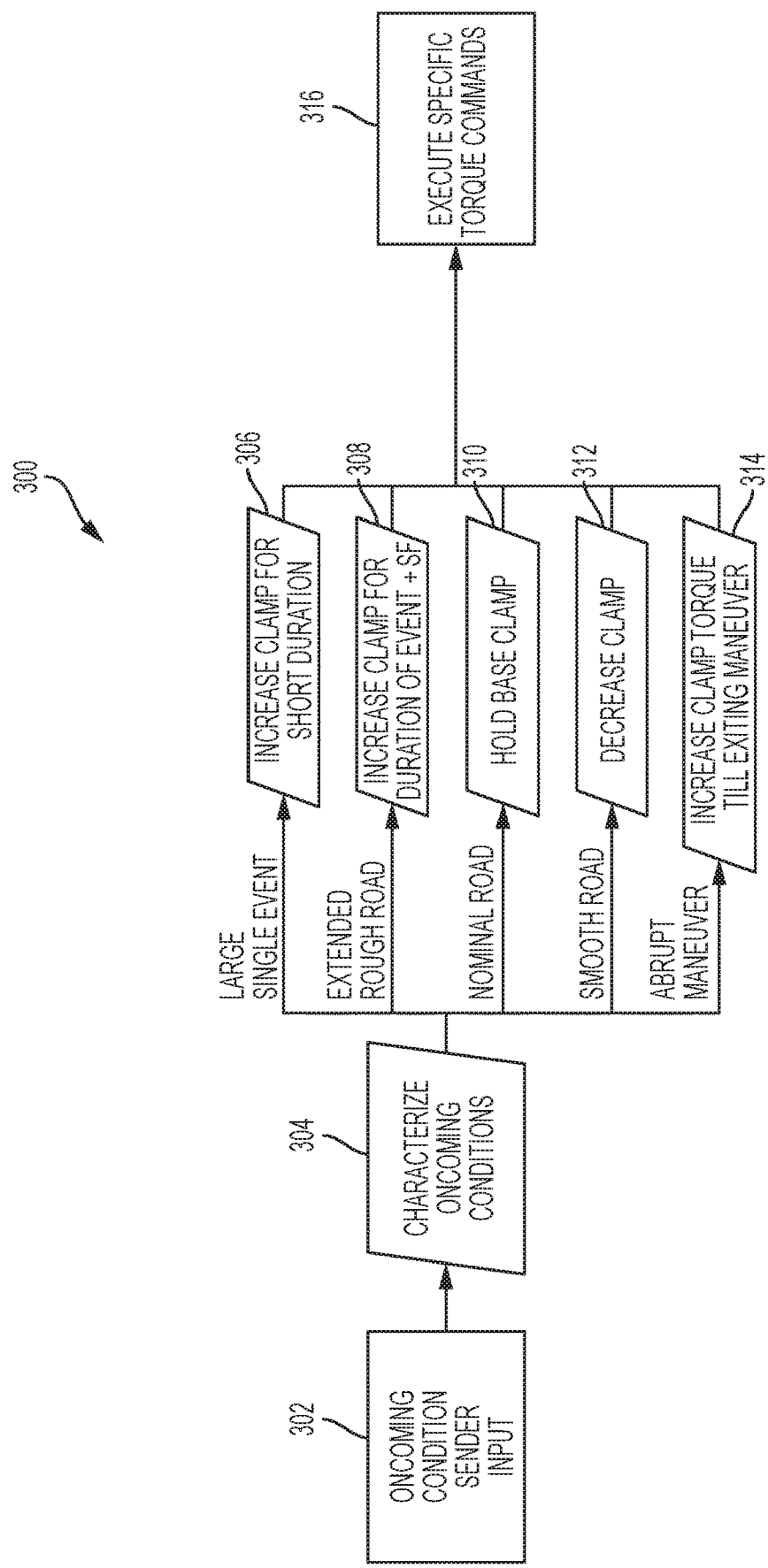
FIG. 3 illustrates a flowchart of an exemplary method stored in an instruction set and executable by the processor of the controller of the vehicle propulsion system of FIG. 1.

The controller 10 of FIG. 1 may be programmed to execute the steps of a method 300 as defined in FIG. 3 and as described in greater detail below. Referring now to FIG. 3, a flowchart of an exemplary method 300 stored in an instruction set and executable by the processor 12 of the controller 10 is shown. The method 300 starts at step 302 where the oncoming condition sensor 170 generates a signal that is indicative of oncoming conditions and sends an oncoming condition signal to the processor 12. Next, at step 304, the processor 12 analyzes the oncoming condition signal and characterizes an oncoming condition based upon the oncoming condition signal analysis. For example, in the method 300 of FIG. 3, the processor 12 characterizes an oncoming condition as one of a large single event, an extended rough road, a nominal road, a smooth road, and an abrupt maneuver. Based upon the characterization of the oncoming condition, the processor 12 selects a CVT clamping strategy from one of the corresponding strategies 306, 308, 310, 312, and 314. If, for example, in step 304 the processor 12 characterizes an oncoming condition as corresponding to a large single event, then the processor 12 selects corresponding strategy 306 in which the processor 12 then increases the CVT clamp for a duration that may correspond to the duration of the condition. If, for example, the processor 12, characterizes an oncoming condition as corresponding to an extended rough road, then the processor 12 selects corresponding strategy 308 in which the processor 12 then increases the CVT clamp for the duration of the oncoming condition with an additional safety factor. If, however, in step 304, the processor 12 determines that the oncoming condition corresponds to a nominal road, then the processor 12 selects the corresponding strategy 310 in which the processor 12 controls the CVT clamp in accordance with a base clamping strategy. If, however, in step 304, the processor 12 determines that the oncoming condition corresponds to a smooth road, then the processor 12 selects the corresponding strategy 314 in which the processor may reduce the CVT clamp below the base clamping strategy. If, however, in step 304, the processor 12 characterizes the oncoming condition as an abrupt maneuver, then the processor 12 selects the corresponding strategy 312, in which the processor 12 increases the CVT clamp until the maneuver has completed. In this manner, the vehicle propulsion system 100 is capable of not only protecting the CVT from oncoming conditions, but also has the ability to recognize oncoming conditions in which the performance and efficiency of the CVT may be improved in those situations where increase clamping may not be required.

Next, in step 316, the controller 10 controls the CVT clamping based upon the characterization in step 304 as corresponding to one of the CVT clamping strategies 306, 308, 310, 312, and/or 314.

In general, the base clamping strategy 310 which may be selected when "nominal" road conditions correspond to the characterization of the oncoming road condition may be analogous to standard CVT clamping strategies in which the clamping is controlled to a nominal level. Existing CVT clamping strategies generally default to a similar nominal or base clamping level. Similarly, the clamp level of the clamping strategy 308 which corresponds to a characterization of the oncoming condition as being an extended rough road may or may not correspond to conventional clamping levels that are applied by existing reactive CVT clamping strategies. A major difference between those existing clamping strategies and the extended rough road clamping strategy of the present disclosure is that the clamping level may be adjusted based directly upon the specific level of roughness of the oncoming condition. Further, the systems and methods of the present disclosure may also adapt the timing of the clamping level based upon knowledge of when the rough road begins and ends, thereby optimizing the actual clamping level in comparison with existing systems.

The method 300 further illustrates a condition in which the vehicle propulsion system of the present disclosure has yet another clear advantage in comparison to existing systems. The oncoming condition being characterized as a large single event. An example of a large single event may be, for example, a two-by-four in the road. By the time a conventional system detects, recognizes, and reacts to the event, it is too late, the event has already passed. These types of events, repeated over time, may adversely affect the durability of a conventional vehicle propulsion system. In stark contrast, the vehicle propulsion system of the present disclosure is able to characterize that two-by-four as a single event, and select the corresponding short duration clamp increase strategy 306. In the strategy 306, the system and method may determine when that event will start and when the event will end and the system has the ability to not only optimize the magnitude of the CVT clamping to protect the CVT, but also to optimize the timing of that clamping such that it only occurs while the vehicle is experiencing the event and not longer than necessary.

In an exemplary aspect, the method 300 may be easily adapted such that the clamping strategy that is selected by the processor 12 is a combination of multiple oncoming conditions as opposed to a single oncoming condition. For example, a cobblestone road may be characterized as an extended rough road and the oncoming condition sensor may also detect a pothole in the road which may be characterized as a large single event. In this instance, the processor 12 may adapt a clamping strategy which compensates for the combination of both of these conditions simultaneously, without limitation.

Further, and in stark contrast to conventional vehicle propulsion systems, the vehicle propulsion system of the present disclosure is able to anticipate and prepare for oncoming conditions, as opposed to merely being reactive to sensing an actual wheel slip event. In order to protect the CVT in those reactive situations, in the absence of any knowledge about the oncoming conditions, those conventional systems must adopt a highly conservative clamping strategy in which a larger safety factor must be added to the clamping strategy. This is because, while those systems may react to actual wheel slip events as they occur, they must assume the worst case possible to protect against the unknown oncoming conditions. In stark contrast, the vehicle propulsion system of the present disclosure is able to optimize the CVT clamping based upon the knowledge of the oncoming conditions.

Additionally, the conservative CVT protection strategies of conventional vehicle propulsion systems have no knowledge about when a current wheel slip condition will end. Therefore, those strategies are required to maintain a higher level of clamp even after the system stops receiving indications of a wheel slip condition. In other words, even when a wheel slip condition ends, those conventional systems wait for an additional delay period before reducing the CVT clamping. In stark contrast, the vehicle propulsion system of the present disclosure has the ability to identify the end of an oncoming condition and, therefore, may confidently reduce CVT clamping immediately or very shortly after the condition passes. In this manner, the systems and methods of the present disclosure better optimize the CVT clamping strategy to actual conditions, thereby improving performance and efficiency of the overall vehicle propulsion system and drivability.

While the present disclosure describes exemplary oncoming conditions, the present invention is not limited to any specific oncoming condition or set of oncoming conditions. Any oncoming condition which may potentially disrupt or damage the CVT is intended to be encompassed by the present disclosure, without limitation. For example, not only could surface irregularities like objects on the road, potholes, rough roads, such as cobblestone or gravel roads, road gradient changes, such as uphill or downhill oncoming road surfaces, reduced friction conditions, like ice, snow, and/or water, vehicle events such as, for example, sudden stops or decelerations, or rolling direction change and the like without limitation. The oncoming condition sensor may monitor not only the road condition, but also other objects on or near the road, such as other vehicles (including through collision avoidance systems), and infrastructure, such as, for example, traffic control signals, stop signs, and the like without limitation. The present disclosure encompasses the ability to recognize these oncoming conditions and adapt the CVT clamp strategy accordingly.

As explained previously, CVT clamp control in existing vehicle propulsion system tend to be reactive rather than pro-active. A problem with this approach is that there are inherent delays in recognizing and reacting to wheel slip. For example, the sensors take time to broadcast their signals and the pressures in the systems take time to react. To compensate for these delays, these systems must be conservative and incorporate higher and/or longer clamp pressures than is actually necessary to prevent and/or reduce the risk for chain slip. This designed in over-clamping of the CVT adversely affects durability, drivability, and fuel economy. While in an exemplary aspect of the present disclosure, the vehicle propulsion system may include some level of over-clamping, in order to incorporate some safety factor into the system control, the level of that over-clamping may be better optimized.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system comprising:
   an oncoming condition sensor that generates an oncoming condition signal;
   a continuously variable transmission with a variator assembly adapted to transfer torque between a first rotating member and a second rotating member through a flexible continuous device rotatably coupling the first rotating member to the second rotating member, one of the first rotating member and second rotating member including a clamping pulley adapted to controllably adjust a clamping force on the flexible continuous device; and
   a controller in communication with the oncoming condition sensor and the continuously variable transmission that is programmed to characterize an oncoming condition based upon the oncoming condition signal and to control the clamping pulley to adjust the clamping force based on the characterization of the oncoming condition, wherein the controller is further programmed to characterize a start time and an end time of the oncoming condition.

2. The system of claim 1, wherein the oncoming condition sensor comprises one of a camera, a light detection and ranging sensor, a radio detection and ranging sensor, an infrared sensor, and a sound navigation ranging sensor.

3. The system of claim 1, wherein the controller is programmed to characterize an oncoming condition as one of a single event, an extended rough road, a nominal road, a smooth road, and an abrupt maneuver.

4. The system of claim 3, wherein the controller controls the clamping pulley to reduce the clamping force in response to the oncoming condition being characterized as a smooth road.

5. The system of claim 3, wherein the controller controls the clamping pulley to increase the clamping force in response to the oncoming condition being characterized as an extended rough road.

6. The system of claim 3, wherein the controller controls the clamping pulley to increase the clamping force in response to the oncoming condition being characterized as an abrupt maneuver.

7. The system of claim 1, wherein the controller controls the clamping pulley based upon the characterized start time and end time of the oncoming condition.

8. The system of claim 7, wherein the controller controls the clamping pulley to increase the clamping force at the start time of the oncoming condition and to reduce the clamping force after the end time of the oncoming condition.

9. The system of claim 1, wherein the controller is further programmed to characterize the oncoming condition in terms of a wheel slip magnitude, and wherein the controller controls the clamping pulley based upon the wheel slip magnitude.

10. A method for controlling a CVT clamping force in a vehicle propulsion system, the vehicle propulsion system in a vehicle with an oncoming condition sensor that generates an oncoming condition signal, a continuously variable transmission with a variator assembly adapted to transfer torque between a first rotating member and a second rotating member through a flexible continuous device rotatably coupling the first rotating member to the second rotating member, one of the first rotating member and second rotating member including a clamping pulley adapted to controllably adjust a clamping force on the flexible continuous device, and a controller in communication with the oncoming condition sensor and the continuously variable transmission, the method comprising:
    characterizing an oncoming condition based upon the oncoming condition signal; and
    controlling the clamping pulley to adjust the clamping force based on the characterization of the oncoming condition; and
    characterizing a start time and an end time of the oncoming condition.

11. The method of claim 10, wherein the oncoming condition sensor comprises one of a camera, a light detection and ranging sensor, a radio detection and ranging sensor, an infrared sensor, and a sound navigation ranging sensor.

12. The method of claim 10, wherein the characterizing of the oncoming condition characterizes the oncoming condition as one of a single event, an extended rough road, a nominal road, a smooth road, and an abrupt maneuver.

13. The method of claim 12, wherein controlling the clamping pulley comprises reducing the clamping force in response to the oncoming condition being characterized as a smooth road.

14. The method of claim 12, wherein controlling the clamping pulley comprises increasing the clamping force in response to the oncoming condition being characterized as an extended rough road.

15. The method of claim 12, wherein controlling the clamping pulley comprises increasing the clamping force in response to the oncoming condition being characterized as an abrupt maneuver.

16. The method of claim 10, wherein controlling the clamping pulley comprises controlling the clamping pulley based upon the characterized start time and end time of the oncoming condition.

17. The method of claim 16, wherein controlling the clamping pulley comprises controlling the clamping pulley to increase the clamping force at the start time of the oncoming condition and to reduce the clamping force after the end time of the oncoming condition.

18. The method of claim 10, further comprising characterizing the oncoming condition in terms of a wheel slip magnitude, and wherein controlling the clamping pulley comprises controlling the clamping pulley based upon the wheel slip magnitude.

* * * * *